(12) United States Patent
Schorpp

(10) Patent No.: US 7,636,523 B2
(45) Date of Patent: Dec. 22, 2009

(54) COMMUNICATION LINK FOR COMMUNICATING DATA

(75) Inventor: Marcus Schorpp, Lempaala (FI)

(73) Assignee: Nokia Corporation, Espoo (FI)

( * ) Notice: Subject to any disclaimer, the term of this patent is extended or adjusted under 35 U.S.C. 154(b) by 513 days.

(21) Appl. No.: 10/564,205

(22) PCT Filed: Oct. 6, 2004

(86) PCT No.: PCT/EP2004/052460

§ 371 (c)(1),
(2), (4) Date: Jan. 9, 2006

(87) PCT Pub. No.: WO2005/034390

PCT Pub. Date: Apr. 14, 2005

(65) Prior Publication Data

US 2006/0188254 A1 Aug. 24, 2006

(30) Foreign Application Priority Data

Oct. 6, 2003 (GB) .................... 0323344.2

(51) Int. Cl.
*H04B 10/00* (2006.01)

(52) U.S. Cl. .............. 398/153; 398/140; 398/130; 398/164

(58) Field of Classification Search ........... 398/202, 398/156, 158, 140, 138, 135, 128, 130, 141, 398/153, 164, 165, 171, 22, 23, 24, 33, 151
See application file for complete search history.

(56) References Cited

U.S. PATENT DOCUMENTS

| | | | |
|---|---|---|---|
| 4,325,146 A | 4/1982 | Lennington | 455/604 |
| 4,994,675 A | 2/1991 | Levin et al. | 250/551 |
| 5,237,603 A | 8/1993 | Yamagata et al. | 379/61 |
| 5,914,976 A | 6/1999 | Jayaraman et al. | 372/50 |
| 6,031,825 A | 2/2000 | Kaikuranta et al. | 370/296 |
| 6,470,132 B1 | 10/2002 | Nousiainen et al. | 385/146 |
| 6,763,195 B1 * | 7/2004 | Willebrand et al. | 398/115 |
| 7,221,285 B1 * | 5/2007 | Hamilton | 340/825.72 |
| 2002/0181055 A1 | 12/2002 | Christiansen et al. | 359/159 |
| 2003/0087610 A1 | 5/2003 | Ono | 455/90 |
| 2005/0117912 A1 * | 6/2005 | Patterson et al. | 398/135 |

FOREIGN PATENT DOCUMENTS

| | | |
|---|---|---|
| DE | 198 09 667 A1 | 9/1999 |
| EP | 0 483 549 A2 | 5/1992 |
| EP | 0 772 307 A1 | 5/1997 |
| GB | 2 304 247 A | 3/1997 |
| KR | 1996-0006467 | 2/1996 |
| WO | WO 02/21730 A2 | 3/2002 |

* cited by examiner

Primary Examiner—M. R. Sedighian
(74) Attorney, Agent, or Firm—Harrington & Smith, PC

(57) ABSTRACT

A communication link for communicating data between a first opto-electronic equipment capable of providing an optical signal and a second opto-electronic equipment capable of receiving the optical signal is described. The communication link includes a first optical channel and a second channel. The first optical channel is preferably a high-speed optical channel for conveying information requiring high-speed connection and the second channel is preferably a slow channel providing, for example a low-power monitoring function. An opto-mechanical device for providing a communication link, including a first opto-electronic equipment for providing an optical signal, a second opto-electronic equipment for receiving the optical signal, a first optical channel and a second channel is also described.

25 Claims, 7 Drawing Sheets

COMMUNICATION LINK FOR COMMUNICATING DATA

FIELD OF THE INVENTION

The present invention relates to optical transmission. In particular, the present invention relates to an improved communication link for communicating data between a first opto-electronic equipment and a second opto-electronic equipment.

BACKGROUND OF THE INVENTION

A number of portable electronic devices may have a so-called split design where two or several parts of the device may be folded on each other or detached from each other. An example of such a device may be a portable telephone apparatus, a Personal Digital Assistant (PDA) apparatus or a laptop computer having for example two halves, a display half and a keyboard half. One example of such a portable device may be the Nokia Communicator. In such a split design device, the different parts need to communicate with each other. Another example of a split design device may be a telephone with detachable accessories, for example with a camera module, or a video camcorder.

Conventionally, the communication connection between the different parts of a split design devices is established by means of cables. For example in the split design telephone, information to be displayed on the display is typically conveyed from the keyboard via a flat cable, which may be a parallel data bus. The flat cable may be connected to one flat cable connector on a circuit board of the display side and to another flat cable connector on a circuit board of the keyboard side. Flat cable may be comprised of a plurality of metal wires to carry electrical current. These metal wires may be individually surrounded by a protective jacket. Bad connections may occur to the flat cable connectors over time. Furthermore, sharp objects and corrosive agents can accidentally break the flat cable, thereby interrupting the communication between the display and the keyboard. Moreover, a flat cable may be bulky as its width depends on the number of wires.

In U.S. Pat. No. 6,470,132, an alternative design for the cable connection is disclosed for a portable electronic device of the type described above. U.S. Pat. No. 6,470,132 describes an optical hinge, which serves as a light guide to convey communication data in optical signals between two circuit boards having opto-electronic devices for transmitting and receiving optical signals. The optical hinge of U.S. Pat. No. 6,470,132 may eliminate the above reliability problems associated with the flat cable and the flat cable connectors. The optical hinge of U.S. Pat. No. 6,470,132 may also provide a connection requiring less space than a cable connection as no mechanical connectors are needed.

In U.S. Pat. No. 5,914,976, vertical cavity surface emitting laser (VCSEL)-based multi-wavelength transmitter and receiver modules for serial and parallel optical links are disclosed. The module includes one or more VCSEL transmitters and photodetectors coincidentally aligned along a common central longitudinal axis. The incoming received light and transmitted light are at different wavelengths and are coupled out of and into the same optical fiber or free-space optical link. The VCSEL transmitter includes a pair of mirror stacks and an active region interposed between the pair of mirror stacks. The mirror stacks are each a system of alternating layers of gallium arsenide (GaAs) and aluminium gallium arsenide (AlGaAs) which forms a distributed Bragg reflector. At least one of the mirror stacks is wafer fused to the active region. One of the mirror stacks is below 0.0001 percent transmissive to the transmitted light. The VCSEL transmitter can be optically pumped by a pump VCSEL, wherein the pump laser radiation is for example an 850 nm pump VCSEL.

In U.S. Pat. No. 6,373,046, a small sized optical transmission unit suitable for non-simultaneous transmission and reception is disclosed. The transmission unit, which is smaller than previously known solutions, is made by mounting the preamplifier circuit, the receiver and the transmitter at least partially on top of each other instead of placing them side by side. The transmitter and the receiver use one and the same optical element. In U.S. Pat. No. 6,373,046, the transmitter may advantageously be a light emitting diode (LED) and the receiver a PIN diode.

However, optical interconnections have not been considered very practical in mobile terminals. Optical connections for data transmission purposes need typically be high-speed connections to provide sufficient data transmission efficiency. The efficiency of the opto-electronic transformers, such as LEDs, lasers, photo diodes, is rather low compared to electrical interconnections. Furthermore, in portable split design electronic devices, it is often required that the receiver part remains permanently awake or is regularly woken up to observe any signals coming in, for example if the keypad is being pressed. High-speed optical connections consume therefore rather a lot of power. However, low power consumption is a crucial factor for mobile terminals, such as portable telephones or PDAs.

The receiver side of an optical interconnection may be switched off to a sleep-mode for power saving purposes. There is, however, no easy way of quickly waking up the interconnection at a specific time, since the receiver cannot receive any signals in the sleep-mode.

The problem can be explained using a PDA device, such as the Nokia 9210 Communicator phone, as an example device. In such a PDA device, there may be a phone function having a small display and possibly a keypad and a PDA function having a larger display and a keyboard. The PDA display and phone display and the PDA keyboard are situated in separate parts communicating with each other. The connection between the separate parts is typically a high-speed data interconnection in order to satisfy the needs of the PDA display. This connection may conventionally be secured by a flex cable as explained above. A serial high-speed optical interconnection might be used to replace the relatively fragile and large flex cable. An optical connection would provide new mechanical design possibilities as it allows high freedom of movement of the separated parts communicating with each other. Using optical connection instead of a flex cable could also reduce the manufacturing time, as less manual work may be needed. The serial optical interconnection may, however, dissipate rather too much power at high data rates. However, when the Communicator's lid is closed, the PDA display may be switched off and no high-speed interconnection is needed anymore. Some interconnection is needed anyhow, since the keyboard functions and the small phone display are still active.

A solution could be to wake-up the high-speed optical receiver in the display part each once in a while for a short duration and check if a long-duration wake-up signal is received. In that case, the duration of the transmitter-initiated wake-up signal and the checking of the receiver, whether a wake-up signal is present, have to be adjusted carefully. The transmitter can switch to high-speed mode only after a worst-case time, which may be calculated from the receivers wake-up-checking periodicity plus the time needed for the receiver to wake up, since the transmitter side does not know when the receiver side wakes up. This makes the wake-up relatively slow and consumes power itself, but on the other hand requires relatively few components.

However, there is a need for an improved communication link for communicating data between a first opto-electronic equipment and a second opto-electronic equipment. It might be desirable to provide an optical high-speed connection with reduced power consumption. In certain cases, it may be advantageous to provide an optical high-speed connection, which is capable of being switched off when not in use and of becoming fully active in a short period of time.

SUMMARY OF THE INVENTION

Embodiments of the present invention aim to address one or several of the above problems or issues.

According to the present invention, there is provided a communication link for communicating data between a first opto-electronic equipment capable of providing an optical signal and a second opto-electronic equipment capable of receiving the optical signal, wherein the communication link comprises a first optical channel and a second channel.

According to the present invention, there is also provided an opto-mechanical device for providing a communication link, comprising a first opto-electronic equipment for providing an optical signal, a second opto-electronic equipment for receiving the optical signal, a first optical channel and a second channel.

According to the present invention, there is also provided a communication link for communicating data between a first opto-electronic equipment for providing an optical signal and a second opto-electronic equipment capable of receiving the optical signal, wherein the communication link comprises a first optical channel and a second channel and the first opto-electronic equipment determines activation of at least a part of a receiver circuit associated with the first optical channel in the second opto-electronic equipment.

In certain embodiments, the first optical channel and the second channel are parallel to each other.

In certain embodiments, the first optical channel is a fast optical channel and the second channel is a slow optical channel.

In other embodiments the first optical channel is a relatively high power optical channel, and the second channel is a relatively low power channel.

In certain other embodiments, the first optical channel is a fast optical channel and the second channel is provided by an electrical connection, such as a cable. In certain other embodiments, the second channel may be provided by another wireless interconnection (e.g. Bluetooth, RFID technology, inductive or capacitive transmission).

In certain other embodiments, the first optical channel and the second channel may be provided by a single optical link.

Preferably, the second channel is capable of providing a continuous monitoring of signal activity from the first opto-electronic equipment. Specifically, a receiver circuit associated with the second channel in the second OEE (opto-electronic equipment) may provide continuous monitoring of signal activity from the first OEE. The first optical channel may be capable of being switched on in accordance with an indication provided by the second channel. Specifically, the second OEE may be responsive to an indication provided over the second channel by the first OEE, to switch on circuitry associated with the first channel in the second OEE, preferably the circuitry is receiver circuitry. The indication provided over the second channel may be initiated by the first OEE, such as in response to a key press. The indication may be initiated by signal activity from the first opto-electronic equipment or by a command from the first opto-electronic equipment. The first optical channel may be switched off when no signal activity is received from the first opto-electronic equipment or when the first opto-electronic equipment provides an appropriate indication, such as a command; alternatively, the first optical channel may be switched on when no signal activity is received from the first OEE. When the first optical channel is switched off, in the second channel there may be a low power monitoring circuitry switched on. In the case of a single optical link providing both the first and the second optical channel, the optical channel may be switched to a slow-speed mode.

References to the first optical channel being switched on or off preferably Involve switching on or off receiver circuitry, although not necessarily all receiver circuitry, associated with the first optical channel In a preferred embodiment the second channel is a unidirectional channel for transmitting signals from the first OEE to the second OEE. Preferably the first channel is a unidirectional channel for transmitting signals from the first OEE to the second OEE. Suitably, the maximum transmit/receive speed or bandwidth over the first channel is greater than the maximum transmit/receive speed or bandwidth of the second channel. The greater transmit/receive speed may be provided for in the second OEE by higher speed receiver circuitry.

In the opto-mechanical device in accordance with the invention the first opto-electronic equipment and the second opto-electronic equipment may be physically connected to each other by a coupling that permits the first opto-electronic equipment to rotate relative to the second opto-electronic equipment about a rotation axis.

Furthermore, an apparatus having at least two separated parts communicating with each other and including the opto-mechanical device according to the invention is provided. Such separated parts may include parts such as a display, a keypad, telephone body, a camera module or the like.

According to one embodiment, the separated parts comprise a keypad associated with the first OEE, and a display associated with the second OEE. According to another embodiment, the separated parts comprise a camera module associated with the first OEE, and the telephone body associated with the second OEE.

BRIEF DESCRIPTION OF FIGURES

The invention will now be described in further detail, by way of example only, with reference to the following examples and accompanying drawings, in which.

DETAILED DESCRIPTION OF THE PREFERRED EMBODIMENTS

Figure 1:
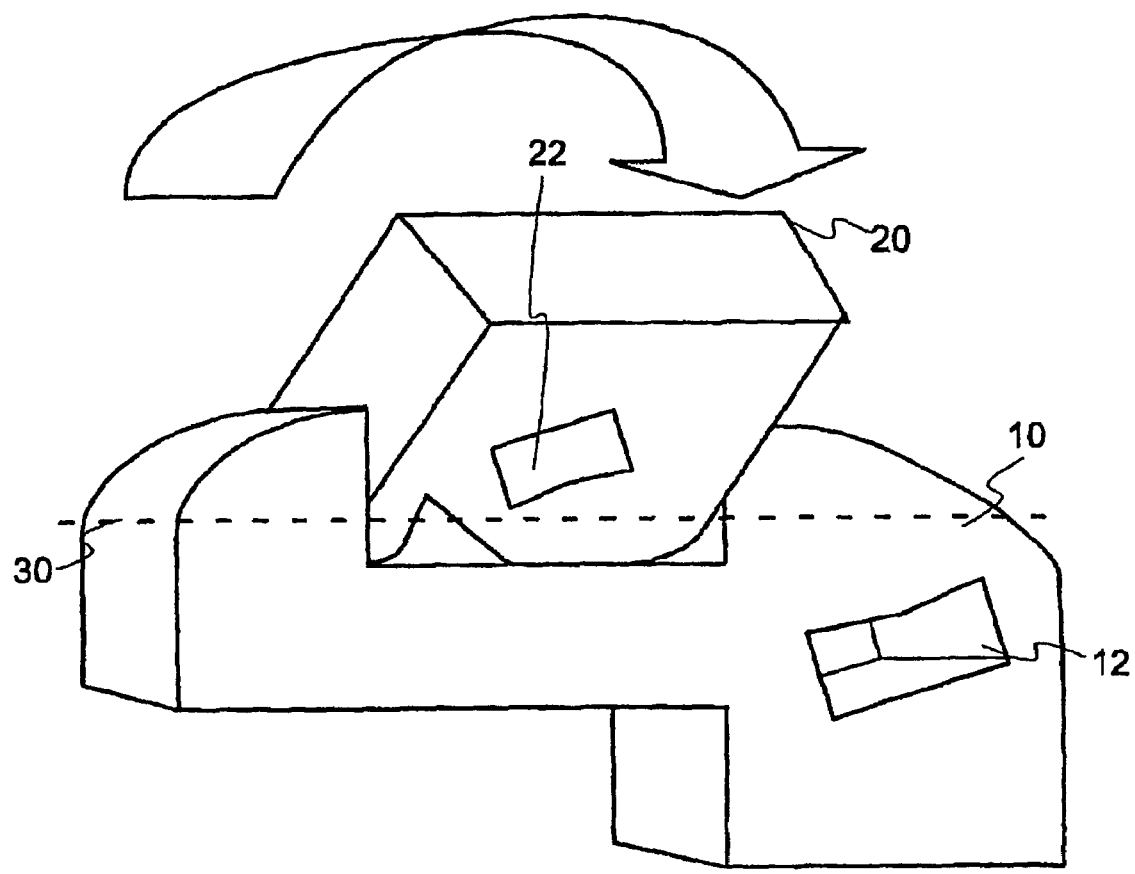
FIG. 1 shows an example of an optical hinge in which the embodiments of the invention may be implemented.

FIG. 1 shows an example of an optical hinge in which the embodiments of the invention may be implemented. The optical hinge of FIG. 1 has a first optical component 10 and a second optical component 20 which are capable of rotating relative to each other about a rotation axis 30 at an angle. The rotation angle may typically about 180 degrees, but can be up to 360 degrees depending on the actual design of the optical hinge. The first and the second optical components 10, 20 are made from an optical material, which is preferably chosen so that it is highly transparent to the optical wavelength to be used in a desired application.

The first optical component 10 has a first cavity 12 for optically coupling the first optical component 10 to an opto-electronic equipment and the second optical component 20 has a second cavity 22 for optically coupling the second optical component 20 to another opto-electronic equipment. The opto-electronic equipments may typically include photo-transceivers, light emitters and/or photosensors. The optical hinge of FIG. 1 is configured to transmit an optical signal produced in an opto-electronic equipment coupled to one cavity to another opto-electronic equipment coupled to the other cavity. A light beam can carry the optical signal to convey information from one opto-electronic equipment to another. Thus, the optical hinge can serve as a communication link between opto-electronic equipments.

Figure 2:
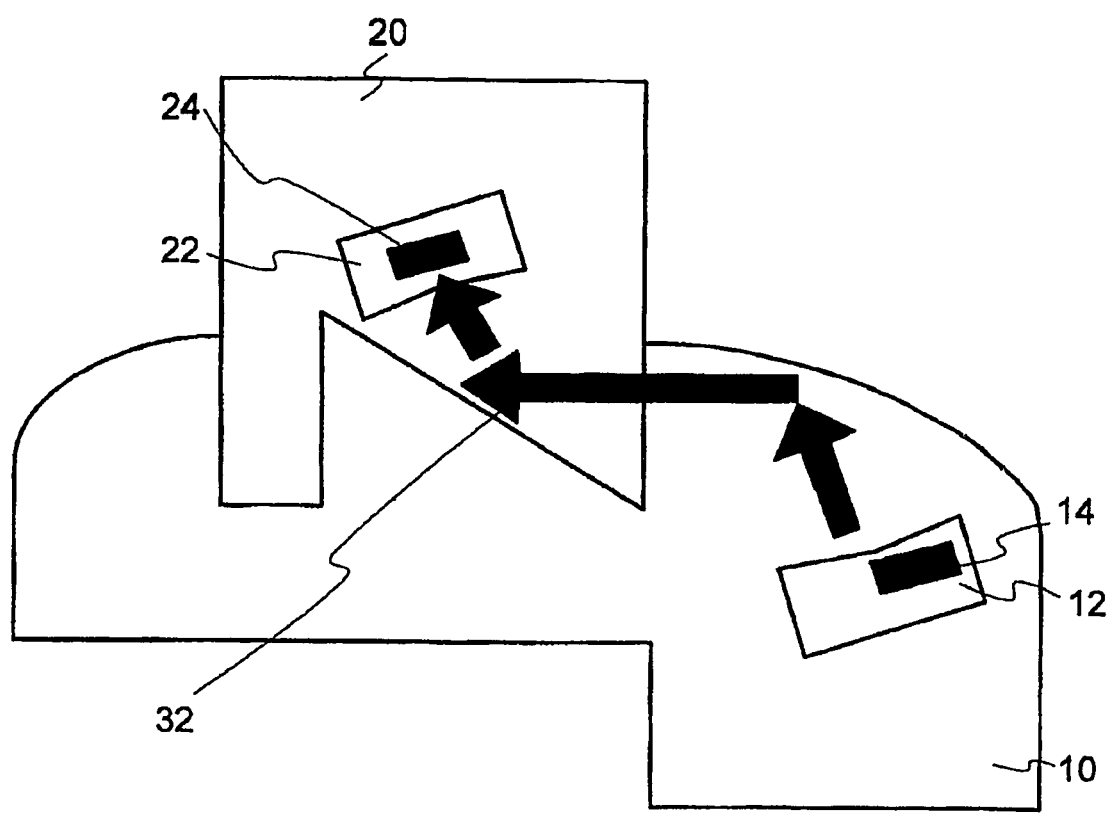
FIG. 2 shows a simplified presentation of the optical function of an optical hinge illustrated in FIG. 1.

FIG. 2 shows a simplified presentation of the optical function of the optical hinge illustrated in FIG. 1. A first opto-electronic equipment 14 capable of producing an optical signal 32 is coupled to the first cavity 12. The optical signal 32 produced by the first opto-electronic equipment 14 is transmitted via the surface of the first cavity 12 to the optical component 10. The optical signal 32 is guided by the optical component 10 towards the optical component 20. The optical signal 32 is then guided to the surface of the second cavity 22 and finally to a second opto-electronic equipment 24 coupled to the second cavity 22.

Figure 3:
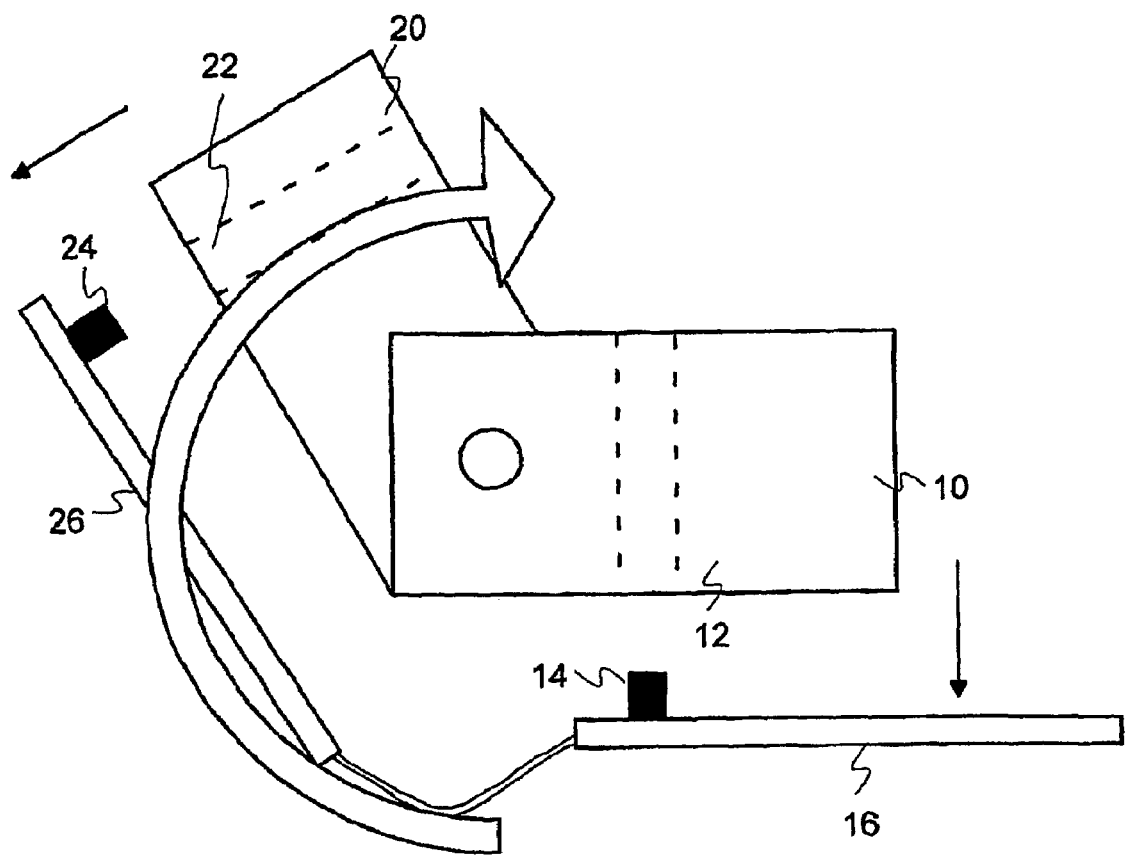
FIG. 3 shows an example of an embodiment utilizing an optical hinge.

In FIG. 3, an example of an embodiment utilizing an optical connection is illustrated. The optical connection may be the optical hinge shown in FIGS. 1 and 2 comprising of a first optical component 10 and a second optical component 20. The first optical component 10 is coupled via the first cavity 12 to a first opto-electronic equipment 14. The first opto-electronic equipment 14 may be, for example, an infrared transmitter and it may be soldered on a first circuit board 16. On the other side of the optical connection, the second optical component 20 is coupled via the second cavity 22 to a second opto-electronic equipment. The second opto-electronic equipment 24 may be, for example, photodiode receiver and it may be soldered on a second circuit board 26.

The function of certain embodiments of the optical hinge of FIGS. 1-3 is disclosed more detailed in U.S. Pat. No. 6,470,132. It shall be appreciated that FIGS. 1-3 show only an example of an optical connection suitable for the purposes of the present invention. The optical connection may differ substantially from the shown and may be any communication connection utilizing an optical channel.

It is also to be noted that the optical signal may be transmitted in the other direction as well. As an example, the second opto-electronic equipment 24 may be a light-emitter and the first opto-electronic equipment 14 may be a photo-sensor receiving the optical signal conveyed by a light beam originating from the second opto-electronic equipment 24. Alternatively, both the first opto-electronic equipment 14 and the second opto-electronic equipment 24 may be devices allowing two-way communication, such as photo-transceivers.

In the examples of the present application, only one-way communication from the first opto-electronic equipment 14 towards the second opto-electronic equipment 24 is illustrated. This is done only in order to emphasize the idea of the present invention. The invention is, however, equally applicable in other types of communication links utilizing an optical channel.

The first opto-electronic equipment 14 and the second opto-electronic equipment 24 may be physically connected to each other by a coupling that permits the first opto-electronic equipment 14 to rotate relative to the second opto-electronic equipment 24 about a rotation axis 30. As an example, this kind of coupling may be used in a portable telephone, a personal digital assistant apparatus, a laptop computer or a video camcorder as explained above. These devices typically have at least two separated parts communicating with each other.

Figure 4:
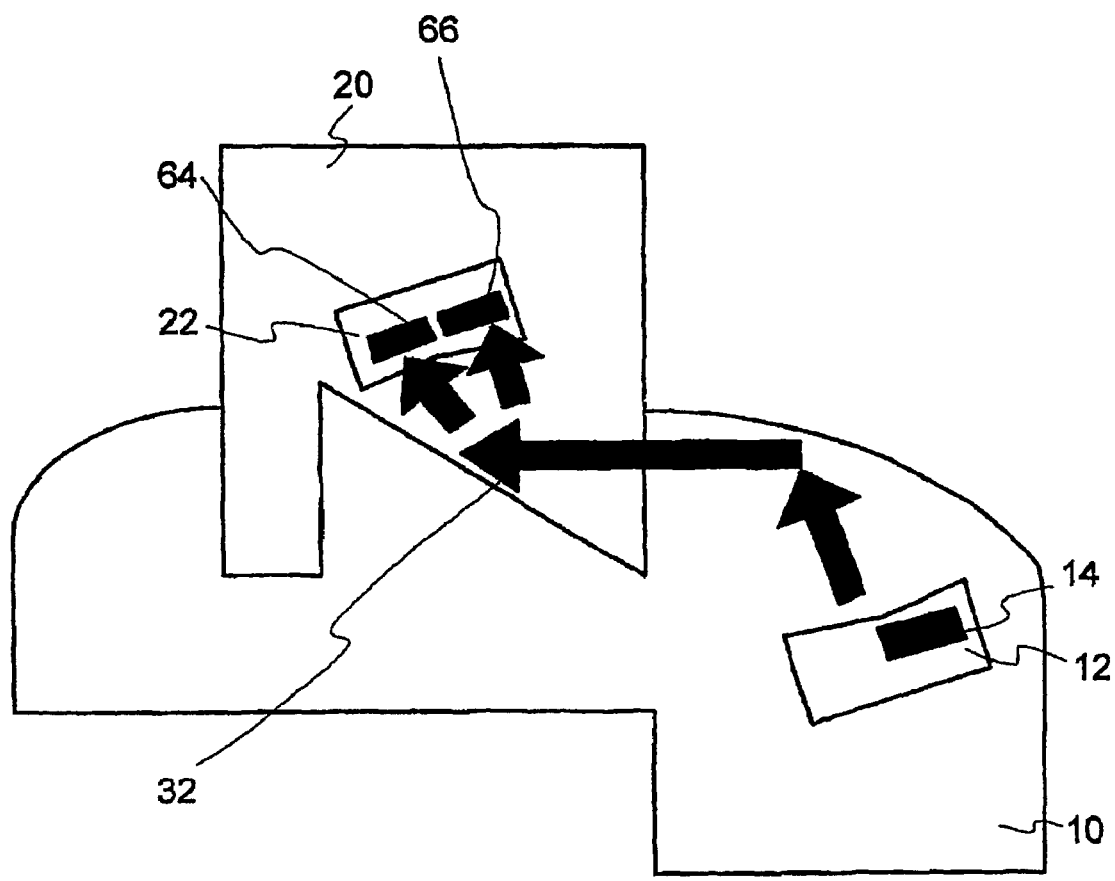
FIG. 4 shows a simplified presentation of the optical function of an optical hinge illustrated in FIG. 1 further including a second channel in accordance with one embodiment of the present invention.

FIG. 4 shows a simplified presentation of the optical function of an optical hinge illustrated in FIG. 1 further including a second channel in accordance with one embodiment of the present invention. In the embodiment illustrated in FIG. 4, the second channel is implemented as an optical channel with an additional second opto-electric equipment. In FIG. 4 a fast receiver photodiode 64 is placed aside a slow wake-up photodiode 66. The optical signal 32 emitted by the transmitter 14 illuminates both receiver photodiodes 64 and 66 simultaneously. The optical signal strength illuminating the slow wake-up photodiode 66 may be the same than or different from the signal strength illuminating the fast receiver photodiode 64.

Figure 5:
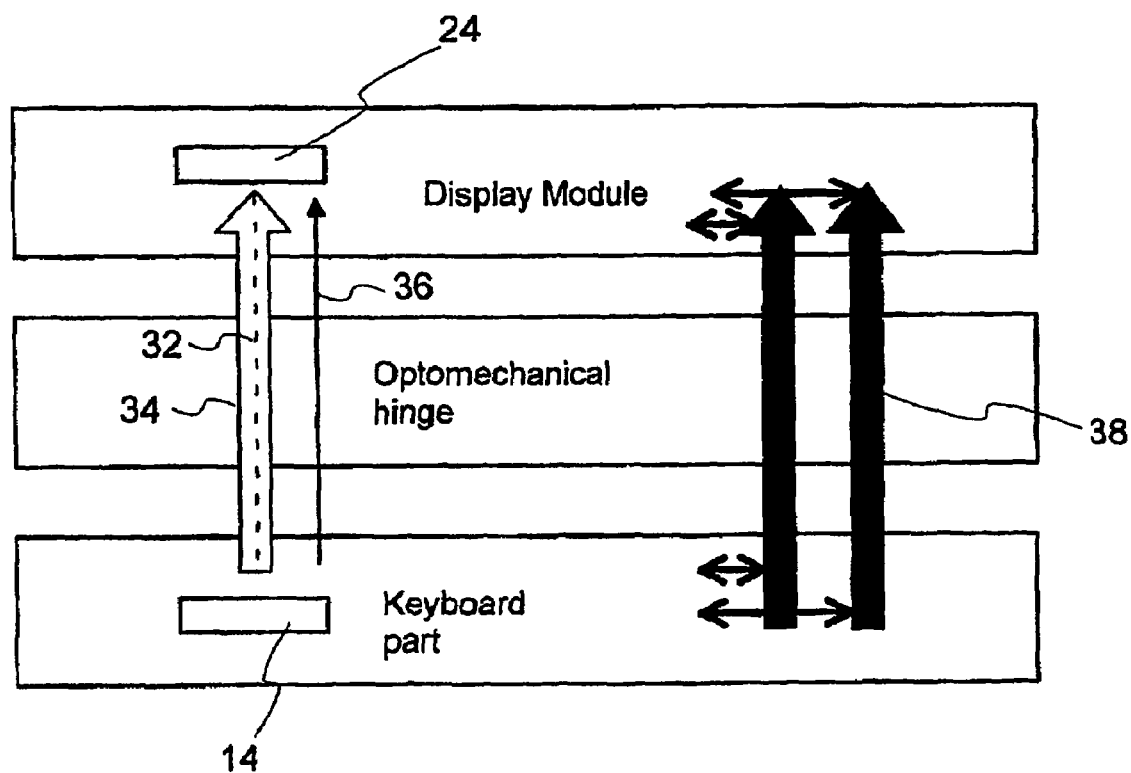
FIG. 5 shows an embodiment of the present invention.

FIG. 5 shows an embodiment of the present invention. In the present invention, a communication link for communicating data between a first opto-electronic equipment 14 and a second opto-electronic equipment 24 is provided with a second channel 36 in addition to the first optical channel 34. The first optical channel 34 is preferably a high-speed optical channel and the second channel 36 is preferably a slow optical channel or a channel provided by an electrical connection. Preferably the data rate of the slow link is a factor of about 1000 slower than the fast link. For example, the high-speed optical channel may have the speed of 100 Mbit/s and the slow optical channel may have the speed of 100 kbit/s. The electrical connection may be an alternate current (AC) modulated signal on top of the direct current (DC) battery power supply.

Preferably, the second channel 36 requires less power than the first channel 34.

The first opto-electronic equipment 14 is capable of providing an optical signal 32 and may be a transmitter, such as a light emitting diode (LED), resonant cavity light emitting diode (RCLED) or vertical cavity surface emitting laser diode (VCSEL). The second opto-electronic equipment 24 is capable of receiving the optical signal 32 and may be a receiver, such as a photodiode or a phototransistor. The optical signal 32 may be transmitted in the first optical channel 34 alone or in both the first optical channel 34 and the second channel 36 either simultaneously or alternating as will be explained below.

Preferably, the second channel 36 is parallel to the first optical channel 34.

The two channels 34, 36 may be provided in several ways. One alternative may be to provide two control circuits for a single photodiode, one circuit for the high-speed connection and the other circuit for the slow connection.

A further alternative for providing two channels 34, 36 may be to provide two photodiodes for optical reception. One, preferably small photodiode is used for the high-speed connection and another photodiode, preferably large, is used for the slow connection. Preferably, the small photodiode is stacked on top of the large photodiode in the same package.

The two channels may be optically separated. In such a case, the slow connection may be used permanently or alternating with the high-speed connection. For example, in a split design telephone, the slow connection may be in use when the telephone is in the closed position and the high-speed connection may be used alone or together with the slow connection when the telephone is in the open position.

A further alternative for providing two channels 34, 36 may be to use a combination of an optical connection and an electrical connection. A high-speed photodiode may be used to provide the first channel 34 for high-speed data communication. An electrical connection, for example an alternate current (AC) modulated signal additional to the direct current (DC) battery power supply, may be used to provide the second channel 36, in particular for monitoring purposes. The electrical connection may be provided, for example, by a battery cable arranged for conveying electrical power from a battery located in one of the first and second opto-electronic equipment to electronic apparatus located in the other of the first and second opto-electronic equipment. Another example might be providing the electrical connection by printed circuit board tracks and a wiper interconnection.

The second channel 36 may be used by the second opto-electric equipment 24 for providing a continuous monitoring of signal activity from the first opto-electronic equipment 14. The second channel 36 may be used for wake-up purposes so that the first optical channel 34 may be switched on in accordance with an indication provided by the second channel 36. The indication may relate to the signal activity from the first opto-electronic equipment 14. The indication may cause the first optical channel 34 to wake up, that is to be switched on if currently in off state, when signal activity from the first opto-electronic equipment 14 is observed by the second OEE on the second channel, or when a particular command from the first OEE 14 is observed by the second OEE on the second channel. The first channel 34 is woken up in the second OEE by activating receiver circuitry associated with the first channel 34, such as the photodiode and or the control circuit for the photodiode.

The indication from the first opto-electronic equipment 14 can determine when the receiver circuitry associated with the first channel and within the second opto-electronic equipment 24 may be activated The first opto-electronic equipment 14, i.e. the transmitter side, knows itself when to wake up as the signal activity is initiated therein. Therefore, nothing has to be changed in the transmitter side compared to a known optical link. At the second opto-electronic equipment 24, i.e. the receiver side, a second, preferably slow and cheap receiver photodiode may be installed, attached to a second, slow, low-power and cheap amplifier/digitizer system.

This slow and cheap receiver photodiode may be coupled to at least part of the receiver circuitry associated with the first channel and within the second opto-electronic equipment 24, in one embodiment the slow and cheap receiver photodiode may be coupled to the high speed photodiode, so as to activate the high speed photodiode upon reception of a wake up or signal activity from the first opto-electronic equipment.

The second photodiode can be in a separate package or preferably in the same package as the high-speed photodiode of the second opto-electronic equipment 24, thereby saving space. Since the first, high-speed photodiode Is preferably small for capacitive reasons and the second, slow wake-up photodiode is preferably large for sensitivity reasons, both photodiode chips can be stacked on top of each other.

Alternatively, both photodiodes can be set aside each other. In this case, a package with incorporated lens may be used. Then, the high-speed photodiode may be placed in the focus of the lens system for best high-speed link performance. The slow wake-up photodiode in that case compensates its optically sub-optimal location with its high sensitivity.

In certain embodiments, the transmitter, such as a LED, and the receiver, such as a photodiode, may be included in a telephone-case external hinge in a split design telephone. This may further reduce the area occupied by the circuit board, as the circuit board is extended to the hinge.

In an embodiment, when the system goes to sleep mode, the transmitter in the first opto-electronic equipment 14 is switched off. When the receiver in the second opto-electronic equipment 24 does not receive any optical signal for some time, the receiver controller switches off the first optical channel 34, which in this embodiment may be the high-speed channel consisting of photodiode and amplifier/digitizer system, and switches to the low power wake-up circuitry in the second channel 36.

To wake up from sleep mode, the transmitter in the first opto-electronic equipment 14 is switched on again and emits a low frequency wake-up signal. The wake-up signal could be even a static signal. The wake-up circuitry in the second channel 36 is able to detect this low frequency signal and induces the first optical channel 34 to switch on the high-speed mode.

Alternatively, the first opto-electronic equipment 14, i.e. the transmitter circuitry, could send a command to the second opto-electronic equipment 24, i.e. the receiver circuitry, indicating that the high-speed mode can be switched to low-power mode. This command might be embedded in the high-speed or slow-speed data stream.

In certain embodiments, the second photodiode may be left out. The wake-up circuitry could be connected in parallel to the high-speed amplifier/digitizer system.

In certain embodiments, the high-speed and slow-speed channels could be separated links. The slow-speed link could be used permanently or alternating to the high-speed link. In the latter case, it would be possible to use the high-speed optical link for high-speed data only and transmit slow-speed data, such as control information, wake-up signal or, in the case of the Nokia Communicator example, data for the small phone display, in the slow-speed link. Then, the second channel 36 indicates that the first, high-speed channel 34 needs to be switched on when through the second channel an appropriate indication, preferably a command, is sent from transmitter 14 to the slow-speed receiver 26. In this embodiment, a second transmitter circuitry may be needed. Dividing the data stream into a high-speed and slow-speed part may make data handling easier. Furthermore, the high-speed optical link can be designed for lower bandwidth, saving power and costs. The slow link can be optimized for its own purposes.

In certain embodiments, the second channel 36 could be provided by an electrical connection, such as a battery cable, preferably in parallel with the first, high-speed optical channel. A wake-up signal could be transmitted through the battery cable in case of electrically connected systems. As is seen from FIG. 5, there may be an additional electrical power connection 38 in the opto-mechanical device. The electrical power connection 38 may be only for power supply purposes or it may provide simultaneously the second channel, thereby omitting the need for a separate second channel 36. The number of electrical connections depends on the design of the opto-mechanical device and there might be one or more electrical connections. The electrical power connection 38 may be provided via the hinge or via conventional external cables. One solution would be an alternate current (AC) modulated signal on top of the direct current (DC) battery voltage. At the receiver side, the AC could be detected through a simple detector with its inputs bandpass-coupled to the battery cable. Using modulation center frequencies separated far enough from each other, one could implement a bi-directional slow data transmission over of the battery cable. By doing so, data can be transmitted also from the display module to the keyboard part.

Figure 6:
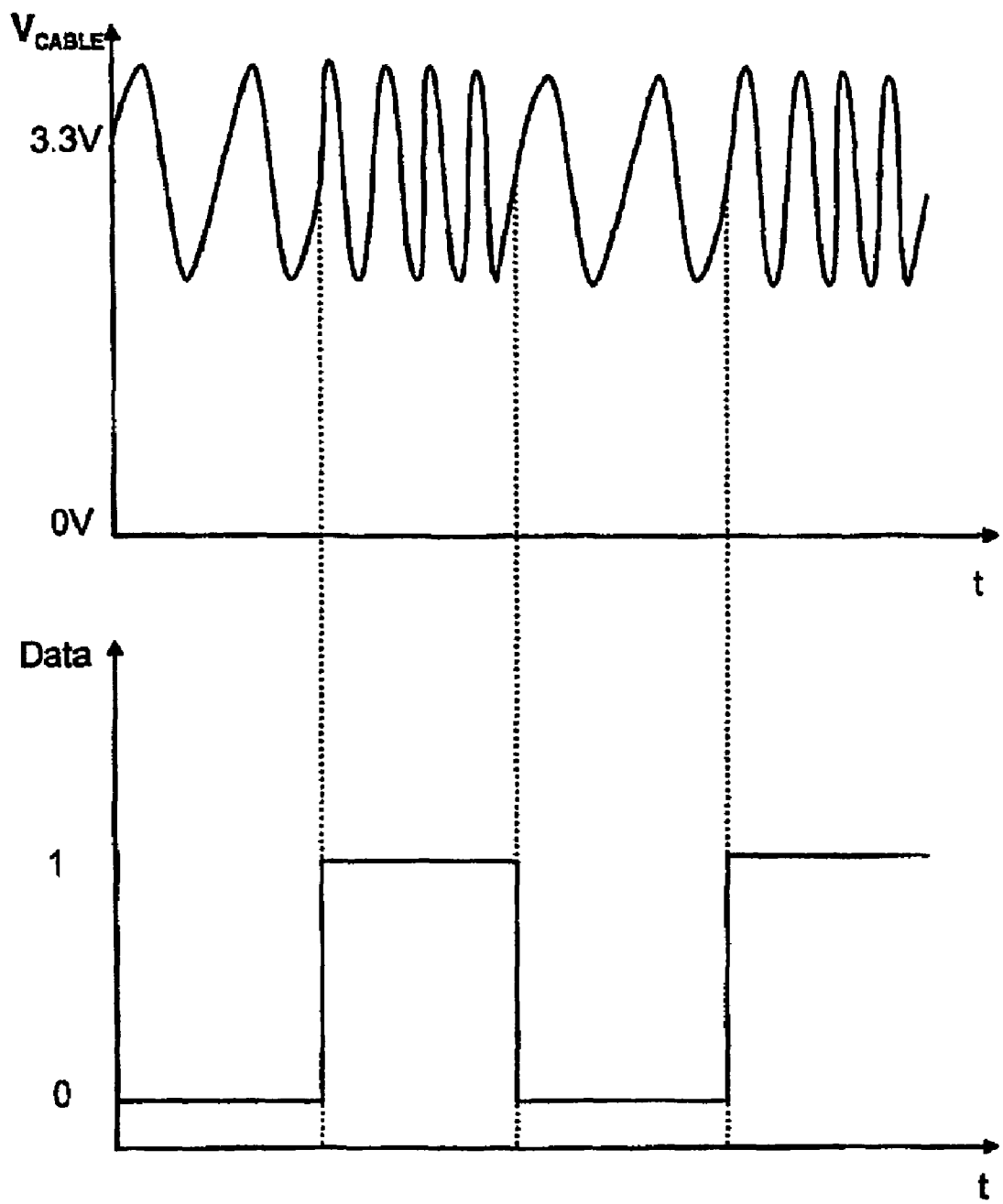
FIG. 6 shows an example of a frequency modulated signal (above) and the corresponding binary data stream (below).

FIG. 6 shows an example of a minimum shift keying (MSK) modulated signal on top of a direct current (DC) battery voltage of 3.3V (above) and its original binary data bit stream (below). When using the MSK with a data rate of e.g. 100 kb/s (kilobit/second), one could select a center frequency of e.g. 500 kHz. The frequency shift is $\frac{1}{4}^{th}$ of the data rate, therefore in this example 25 kHz. A '0'-bit would then be represented by a signal frequency of 525 kHz, a '1'-bit by a signal frequency of 475 kHz or vice versa. Other modulations schemes can be used similarly, allowing battery power transmission and data transmission through the same cable at the same time.

Figure 7:
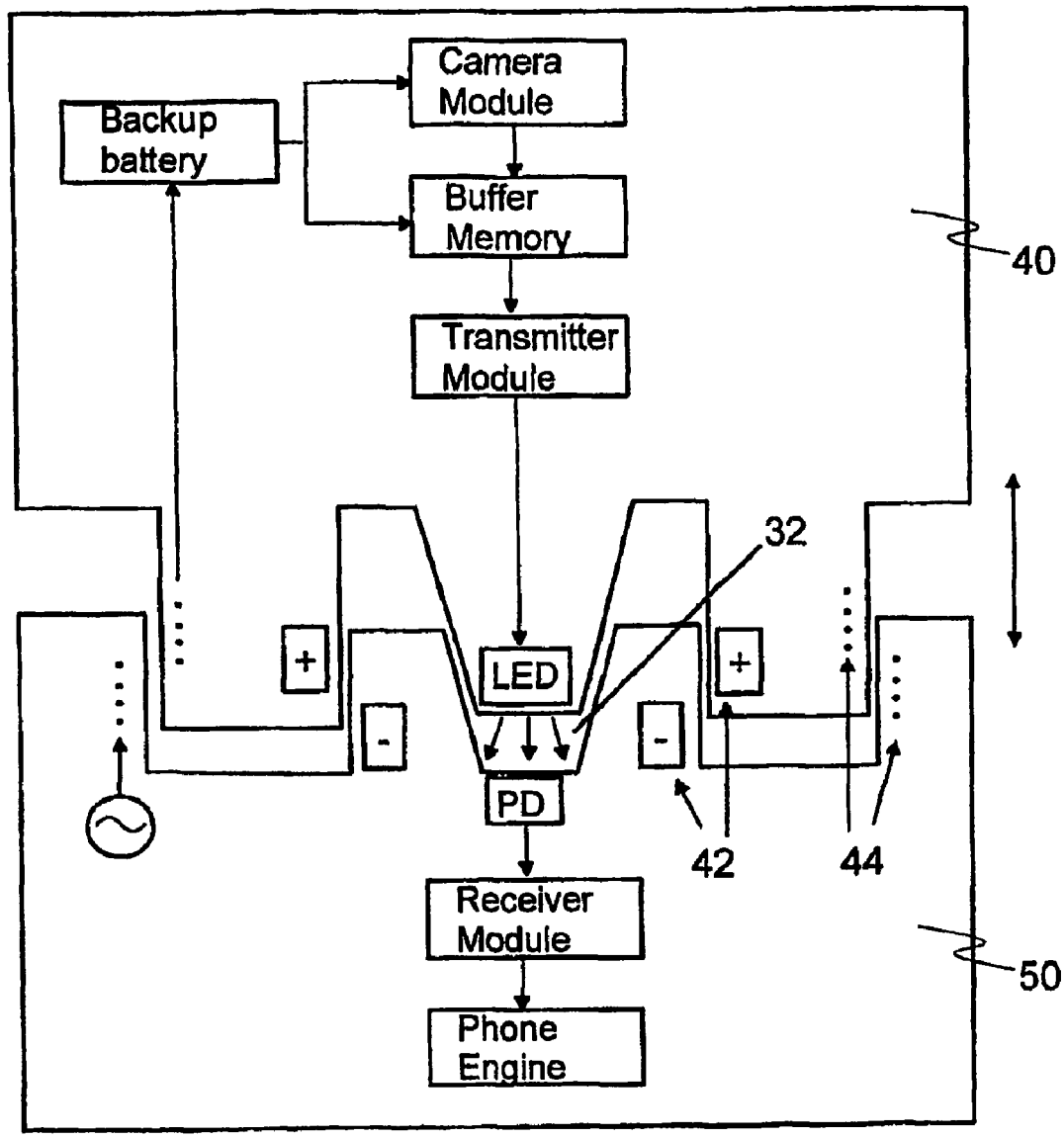
FIG. 7 shows an example of a device in which the embodiments of the invention may be implemented.

The opto-mechanical device described here may be used in various split design apparatus as explained above. Such apparatus may include, but is not limited to, a portable phone optionally with detachable module(s) such as a camera, a personal digital assistant, a laptop computer or a video camcorder. The at least two separated parts may include a keypad part and a display part. The first opto-electronic equipment may include a transmitter light emitting diode situated in the keypad part and the second opto-electronic equipment may include a receiver photodiode situated in the display part. As another example, the at least two separated parts may include a camera module and a telephone body This is shown in FIG. 7. In that case, the first opto-electronic equipment may include a transmitter light emitting diode situated in the camera module. The two parts of the device may be interconnected by an optical hinge described above or by another optical connection, such as optical fibers.

FIG. 7 shows a portable electronic device body 50, such as a mobile telephone, provided with a detachable camera module 40. In this embodiment, the camera module may act as a transmitter emitting an optical signal 32 towards the device body 50. The camera module 40 may be mechanically fixed to the device body 50 for example by means of magnets 42 and electrically by means of inductors 44. The camera module 40 may be provided with a standalone mode through a backup battery or an own battery system so that no inductive coupling is needed during the standalone mode. This exemplary configuration provides an easy, water tight and durable interface between a detachable camera module and a mobile terminal. The camera module may easily be turned. A personal computer may be provided with similar connections thereby providing further alternatives for the use of the camera device.

In a further embodiment the portable electronic device 50 and camera module 40 of FIG. 7 may be devices which are not physically coupled and can operate independently of one another but may be operatively coupled to one another over a short distance, such as a meter or less. The two devices may, for example, be located on a worktop or desk or perhaps in a car. In this embodiment the camera may transfer images to the portable electronic device, such as a radiotelephone for onward transmission of said images; alternatively two devices such as a camera and a printer could be operatively coupled.

As is apparent from the above description, this invention may allow, for example, realizing a low-power sleep-mode for an optical link, preferably allowing switching the high-speed, high-power consuming parts completely off, leaving only a slow, preferably ultra-low-power, cheap and small wakeup-channel alive.

The devices and functions described in the context of the present invention may also have additional functions. As an example, the second opto-electric equipment may be used additionally to the described system to monitor the optical signal strength from the transmitter and either to adjust the receiver amplification or the transmitter power. For the latter, a command may be sent through an additional downlink.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. Apparatus, comprising:
first receiver circuitry configured to receive, via a first communication channel, first data transmitted from within the apparatus in the form of an optical signal; and
second receiver circuitry configured to receive, via a second communication channel, second data transmitted from within the apparatus;
wherein the first receiver circuitry has a first mode in which it is not operable to receive the first data, and a second mode in which it is operable to receive the first data, and in response to the second receiver circuitry receiving the second data when the first receiver circuitry is in the first mode, the first receiver circuitry is operable to switch from being in the first mode to being in the second mode,
wherein the first receiver circuitry comprises an opto-electronic device, wherein the second data is in the form of an optical signal and the second receiver circuitry comprises a second opto-electronic device, and wherein the first and second opto-electronic devices are provided in a same package.

2. Apparatus as claimed in claim 1, wherein when the first receiver circuitry is in the second mode, it is configured to consume more power than the second receiver circuitry when the second receiver circuitry is operable to receive the second data.

3. Apparatus as claimed in claim 1, wherein the first communication channel is operable to transfer data more quickly than the second communication channel.

4. Apparatus as claimed in claim 1, wherein the second data is in the form of an optical signal, and the first receiver circuitry and the second receiver circuitry have different control circuits.

5. Apparatus as claimed in claim 1, wherein when the first receiver circuitry does not receive an optical signal for a period of time, it is configured to enter into a sleep mode.

6. Apparatus as claimed in claim 5, wherein the apparatus is configured such that the second data indicates that the second receiver circuitry is to wake up the first receiver circuitry from the sleep mode.

7. Apparatus as claimed in claim 1, wherein the second receiver circuitry is configured to continuously monitor the second communication channel for the second data.

8. An apparatus as claimed in claim 1, wherein the apparatus is a portable electronic apparatus.

9. Apparatus comprising:
first receiver circuitry configured to receive, via a first communication channel, first data transmitted from within the apparatus in the form of an optical signal; and
second receiver circuitry configured to receive, via a second communication channel, second data transmitted from within the apparatus;
wherein the first receiver circuitry has a first mode in which it is not operable to receive the first data, and a second mode in which it is operable to receive the first data, and in response to the second receiver circuitry receiving the second data when the first receiver circuitry is in the first mode, the first receiver circuitry is operable to switch from being in the first mode to being in the second mode, wherein the second data is in the form of an electrical signal, and wherein the second communication channel is provided by a cable for conveying power from a battery to the second receiver circuitry.

10. Apparatus as claimed in claim 9, wherein the second data is an alternating current modulated signal.

11. Apparatus comprising:
first receiver circuitry configured to receive, via a first communication channel, first data transmitted from within the apparatus in the form of an optical signal; and
second receiver circuitry configured to receive, via a second communication channel second data transmitted from within the apparatus;
wherein the first receiver circuitry has a first mode in which it is not operable to receive the first data, and a second mode in which it is operable to receive the first data, and in response to the second receiver circuitry receiving the second data when the first receiver circuitry is in the first mode, the first receiver circuitry is operable to switch from being in the first mode to being in the second mode, wherein the apparatus comprises an optical transmitter for transmitting the first data, and wherein the apparatus comprises two parts, one of which comprises the optical transmitter and one of which comprises the first receiver circuitry and the second receiver circuitry.

12. Apparatus as claimed in claim 11, wherein the two parts are movable relative to each other.

13. Apparatus as claimed in claim 12, wherein the two parts are connected by a hinge for rotating one of the parts relative to another.

14. Apparatus as claimed in claim 13, wherein the hinge is an optical hinge comprising the first communication channel.

15. Apparatus as claimed in claim 11, wherein one of the parts is detachable from the other part.

16. A method, comprising:
receiving data at first receiver circuitry;
in response to receiving the data at the first receiver circuitry, switching second receiver circuitry from being in a first mode in which the second receiver circuitry is not operable to receive further data in the form of an optical signal, to being in a second mode in which the second receiver circuitry is operable to receive the further data in the form of an optical signal; and
receiving, at the second receiver circuitry, the further data in the form of an optical signal,
wherein the first receiver circuitry is art of a portable electronic apparatus and the first receiver circuitry and the second receiver circuitry are located in a first part of the portable electronic apparatus, the first data is transmitted by an optical transmitter, located in a second part of the portable electronic apparatus, and the first and second parts of the portable electronic apparatus are movable relative to each other, and wherein the first and second parts are connected to each other by a hinge for rotating the first and second parts relative to each other.

17. A method as claimed in claim 16, wherein when the second receiver circuitry is in the second mode, it consumes more power than the first receiver circuitry when the first receiver circuitry is operable to receive the data.

18. A method as claimed in claim 16, wherein the second receiver circuitry comprises an opto-electronic device and processes an optical signal.

19. A method as claimed in claim 18, wherein the data is in the form of an optical signal and the first receiver circuitry comprises the opto-electronic device, and the first receiver circuitry and the second receiver circuitry have different control circuits.

20. A method as claimed in claim 18, wherein the data is in the form of an optical signal and the first receiver circuitry comprises a second opto-electronic device.

21. A method as claimed in claim 16, wherein the data is in the form of an electrical signal.

22. A method as claimed in claim 21, wherein a communication channel is provided by a cable conveying power from a battery to the second receiver circuitry.

23. A method as claimed in claim 16, wherein when the second receiver circuitry does not receive an optical signal for a period of time, it enters into a sleep mode.

24. A method as claimed in claim 23, wherein the data indicates that the first receiver circuitry is to wake up the second receiver circuitry from the sleep mode.

25. Apparatus, comprising:
a first part;
a second part, movable relative to the first part;
an optical transmitter, located in the second part, for transmitting first data in the form of an optical signal;
first receiver circuitry, located in the first part, for receiving the first data in the form of an optical signal, via a first communication channel; and
second receiver circuitry, located in the first part, for receiving second data transmitted from the second part, via a second communication channel;
wherein the first receiver circuitry has a first mode in which it is not operable to receive the first data, and a second mode in which it is operable to receive the first data, and in response to the second receiver circuitry receiving the second data when the first receiver circuitry is in the first mode, the first receiver circuitry is operable to switch from being in the first mode to being in the second mode.

* * * * *

UNITED STATES PATENT AND TRADEMARK OFFICE
CERTIFICATE OF CORRECTION

PATENT NO. : 7,636,523 B2 Page 1 of 1
APPLICATION NO. : 10/564205
DATED : December 22, 2009
INVENTOR(S) : Schorpp It is certified that error appears in the above-identified patent and that said Letters Patent is hereby corrected as shown below:

Claim 11, col. 11, line 35, delete "channel1" and insert --channel--.
Claim 16, col. 12, line 7, delete "art" and insert --part--.

Signed and Sealed this

Ninth Day of March, 2010

David J. Kappos
*Director of the United States Patent and Trademark Office*